(12) United States Patent
Nakamura et al.

(10) Patent No.: US 7,252,031 B2
(45) Date of Patent: Aug. 7, 2007

(54) CYLINDER APPARATUS

(75) Inventors: Hiroshi Nakamura, Yokohama (JP); Yoshiaki Totani, Ayase (JP)

(73) Assignee: Kabushiki Kaisha Hitachi Seisakusho, Tokyo (JP)

( * ) Notice: Subject to any disclaimer, the term of this patent is extended or adjusted under 35 U.S.C. 154(b) by 586 days.

(21) Appl. No.: 10/638,512

(22) Filed: Aug. 11, 2003

(65) Prior Publication Data
US 2004/0060787 A1 Apr. 1, 2004

(30) Foreign Application Priority Data
Sep. 30, 2002 (JP) .............................. 2002-286293

(51) Int. Cl.
*F01B 11/02* (2006.01)
(52) U.S. Cl. ...................... 92/85 A; 188/284
(58) Field of Classification Search ................ 92/85 A; 188/284
See application file for complete search history.

(56) References Cited
U.S. PATENT DOCUMENTS
5,024,301 A * 6/1991 Cook .......................... 188/284

FOREIGN PATENT DOCUMENTS

| JP | UM 4-95332 | 8/1992 |
|---|---|---|
| JP | H 05-321970 | 12/1993 |
| JP | 2001-193782 | 7/2001 |
| JP | 2002-257178 | 9/2002 |

* cited by examiner

*Primary Examiner*—F. Daniel Lopez
(74) *Attorney, Agent, or Firm*—Brinks Hofer Gilson & Lione

(57) ABSTRACT

In a cylinder apparatus such as a hydraulic shock absorber, a piston to which a piston rod is connected slidably is inserted into a cylinder which contains liquid oil. A rebound spring is wound around the piston rod with one end of the piston rod fixed to the piston rod using a spring holder. The rebound spring is slidably guided along the piston rod by means of another spring holder. A rebound stopper is fixed to the piston rod at a position between the spring holders. The rebound spring exerts a spring force opposite to the extension of the piston rod, thereby to moderate shock at the end of the stroke of the piston. Because the spring holder comes into contact with the rebound stopper, contact of adjacent linear portions of the rebound spring with each other due to excessive compression of the rebound spring can be prevented, and also occurrence of strange noise and damage of the rebound spring can be prevented.

4 Claims, 1 Drawing Sheet

CYLINDER APPARATUS

BACKGROUND OF THE INVENTION

1. Field of the Invention

The present invention relates to a cylinder apparatus in which a piston having a piston rod connected thereto is slidably inserted into a cylinder, such as a hydraulic shock absorber, a gas spring, and so on.

2. Description of Related Art

As an example of a hydraulic shock absorber to be mounted in a suspension system of a vehicle such as an automobile, there has been the type disclosed in JP-A-6-101734, in which a rebound spring (a helical compression spring) is wound around a piston rod connected to a piston which is slidably inserted into a cylinder. In this hydraulic shock absorber, when the piston rod has been extended up to a position near its maximum extendable position, the rebound spring is compressed and exerts a spring force against further extension of the piston rod so that it is difficult for the piston rod to arrive at the end of its stroke, and thus the shock at end of the stroke is moderated.

However, the conventional hydraulic shock absorber provided with the rebound spring as described above has had the following problem. When the piston rod has been extended and has arrived at the end of its stroke, the rebound spring will be compressed into the maximum compressed state, and adjacent linear portions of the rebound spring may touch one another. As a result, strange noises may arise, and the rebound spring may be damaged.

The present invention has been made in view of the above described problem, and an object of the invention is to provide a cylinder apparatus in which mutual contact between linear portions of a rebound spring can be prevented.

SUMMARY OF THE INVENTION

In order to solve the above described problem, there is provided according to the invention a cylinder apparatus comprising a cylinder, a piston which is slidably inserted into the cylinder, and a piston rod which is connected to the piston at one end of the rod and extended outside of the cylinder at the other end, wherein the cylinder apparatus further includes in the cylinder a rebound spring having at one end a spring holder which is slidably guided along the piston rod, and whose other end is fixed to the piston so as to be compressed by an extending stroke of the piston rod, and a stopper unit which is fixed to the piston rod apart from the piston at a position between the spring holder and the piston, and adapted to come into contact with the spring holder before the rebound spring has arrived at the maximum compressed state, thereby preventing further compression of the rebound spring.

According to the above described structure, when the piston rod is extended and the rebound spring is compressed, the spring force of the rebound spring is exerted against further extension of the piston rod. When the rebound spring has been compressed up to a determined position, the stopper unit will prevent further compression of the rebound spring.

On this occasion, a repulsive force of the rebound spring when the rebound spring is compressed will be received by the piston to which the rebound spring is connected, while the force for preventing the compression of the rebound spring beyond the determined amount will be received by the stopper unit which is separated from the piston. Therefore, the force generated when the cylinder apparatus is in the maximum extended state can be dispersed.

Moreover, as the stopper unit, a rebound stopper which has been heretofore provided in a manner fixed to the piston rod can be used.

DESCRIPTION OF PREFERRED EMBODIMENT

Figure 1:
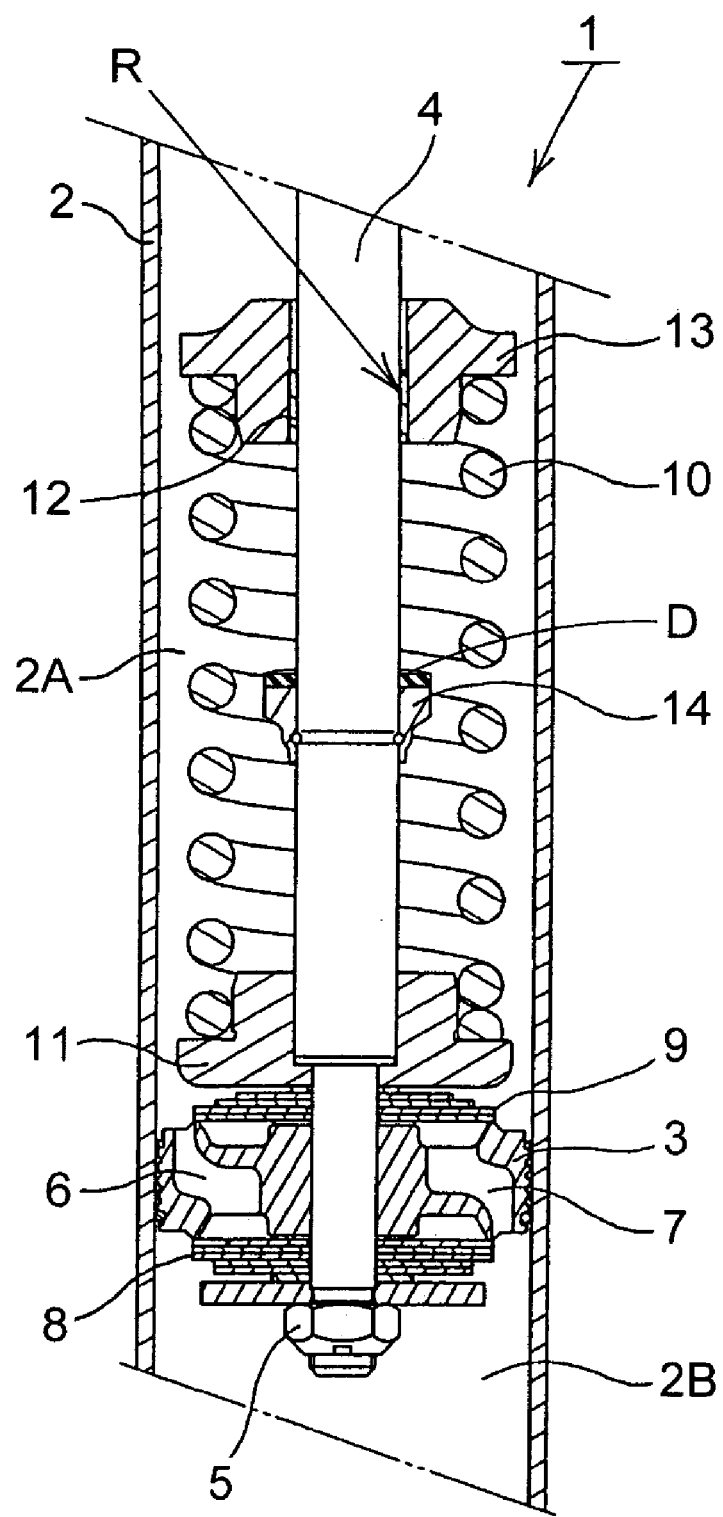
FIG. 1 is a vertical sectional view showing the essential part of a hydraulic shock absorber according an embodiment of the invention.

Now, an embodiment of the present invention will be described in detail referring to the drawing.

Referring to FIG. 1, the embodiment of the invention will be described. As shown in FIG. 1, the hydraulic shock absorber 1 according to the embodiment of the invention is a single cylinder hydraulic shock absorber to be mounted on a suspension system in an automobile, and includes a cylinder 2 in which liquid oil is contained, and a piston 3 which is slidably inserted into the cylinder 2. The interior of the cylinder 2 is divided by this piston 3 into two chambers, namely, an upper cylinder chamber 2A and a lower cylinder chamber 2B. One end of a piston rod 4 is connected to the piston 3 by means of a nut 5, while the other end of the piston rod 4 is passed through a rod guide (not shown) and an oil seal (not shown) which are attached to an upper end part of the cylinder 2, and extended to the outside. A free piston (not shown) is slidably provided in a lower end part of the cylinder 2. The cylinder 2 is further provided with a gas chamber in its bottom part, and high pressure gas is filled in the gas chamber.

The piston 3 is provided with an extension side oil passage 6 and a compression side oil passage 7 for allowing the upper and lower cylinder chambers 2A, 2B to be communicated with each other. The extension side oil passage 6 and the compression side oil passage 7 are respectively provided with an extension side damping force generating mechanism 8 and a compression side damping force generating mechanism 9. Both the extension side damping force generating mechanism 8 and the compression side damping force generating mechanism 9 include an orifice, a disc valve, and the like, and control the flow of the liquid oil and generate damping force.

A rebound spring (a helical compression spring) 10 is inserted in the upper cylinder chamber 2A and arranged around the piston rod 4. One end of the rebound spring 10 is engaged and fixed to a spring holder 11 which is fixed to the piston rod 4 by the nut 5 together with the piston 3. The other end of the rebound spring 10 is a free end, and a spring holder 13 which is slidably guided along the outer periphery of the piston rod 4 by way of a bushing 12 is fixed to the free end so as to be outside the spring. An inner peripheral face of the bush 12 is coated with fluorine resin (R) such as PTFE. When the piston rod 4 has been extended up to a determined position, the spring holder 13 comes into contact with the above described rod guide, and the rebound spring 10 is compressed.

A rebound stopper 14 (stopper unit) is fixed to the piston rod 4 at a position between the spring holder 11 and the spring holder 13. The rebound stopper 14 is arranged in such a manner that when the spring holder 13 has come into contact with the rod guide and the rebound spring 10 has been compressed, the rebound stopper 14 may come into contact with the spring holder 13 before the rebound spring 10 is compressed into its maximum compressed state and the adjacent linear portions of the spring touch one another, thereby preventing further compression of the rebound spring 10.

It is desirable that shock absorbing material (D) such as rubber be attached to faces of the spring holder 13, the rebound stopper 14, and the rod guide which respectively contact with each other in order to restrain occurrence of shocks and striking sounds when they contact each other. In FIG. 1, the shock absorbing material (D) is attached to the face of the rebound stopper 14 only. Particularly, because the spring holder 13 and the rebound stopper 14 often receive large forces, they are made of metal in many cases, so as to bear the large forces. However, by attaching the shock absorbing material to their surfaces, occurrence of the shocks and striking sounds can be restrained, even though they are made of metal.

Then, operation of the present embodiment having the above described structure will be explained.

During an extending stroke of the piston rod 4, the liquid oil in the upper cylinder chamber 2A flows through the extension side oil passage 6 of the piston 3 into the lower cylinder chamber 2B, according to the sliding motion of the piston 3 inside the cylinder 2, and damping force will be generated by the extension side damping force generating mechanism 8. On this occasion, the gas in the gas chamber will expand in proportion to withdrawal of the piston rod 4 from the cylinder 2 to compensate for volumetric change inside the cylinder 2.

During a compressing stroke, the liquid oil in the lower cylinder chamber 2B flows through the compression side oil passage 7 of the piston 3 into the upper cylinder chamber 2A, according to the sliding motion of the piston 3 inside the cylinder 2, and damping force will be generated by the compression side damping force generating mechanism 9. On this occasion, the gas in the gas chamber will be compressed in proportion to intrusion of the piston rod 4 into the cylinder 2 thereby to compensate for volumetric change inside the cylinder 2.

When the piston rod 4 has been extended up to the determined position, the spring holder 13 comes into contact with the rod guide which is attached to the upper end part of the cylinder, and the rebound spring 10 is compressed by further extension of the piston rod 4. By action of the rebound spring 10, the piston rod 4 will be restrained from arriving at the end of its stroke, and at the same time, the shock at the end of the stroke can be moderated.

When the spring holder 13 has slid along the piston rod 4 and comes into contact with the rebound stopper 14, the piston rod 4 arrives at the end of the stroke. On this occasion, the spring holder 13 comes into contact with the rebound stopper 14 before the rebound spring 10 has been compressed into the maximum compressed state, and consequently, the further compression of the rebound spring 10 is prevented. As a result, strange noises and damage of the rebound spring 10 which may occur when adjacent linear portions of the rebound spring 10 touch one another can be prevented. Moreover, by guiding the free end of the rebound spring 10 along the piston rod 4 by means of the spring holder 13, the rebound spring 10 can be smoothly extended and compressed.

In this case, a repulsive force of the rebound spring 10 when the rebound spring 10 is compressed will be received by the spring holder 11 which is connected to the piston 3 and to which the rebound spring 10 is connected, and a force for preventing compression of the rebound spring 10 beyond the determined amount will be received by the rebound stopper 14, which is a stopper unit separated from the spring holder 11 (in other words, separated from the piston 3). Consequently, the force generated when the hydraulic shock absorber 1 is at the maximum extended position can be dispersed.

Moreover, even in the hydraulic shock absorber of a type in which the rebound spring 10 is not provided, the rebound stopper 14 is generally provided in order to determine the maximum extended position of the hydraulic shock absorber. In the present embodiment, this rebound stopper 14 which has been heretofore provided can be used as the stopper unit for restricting the compression of the rebound spring 10 so as not to arrive at the maximum compressed state. Therefore, the number of necessary components can be decreased.

Although the present invention has been described in the above described embodiment referring to a case as applied to the single cylinder hydraulic shock absorber, the invention can be also applied in the same manner to a cylinder apparatus in which a piston having a piston rod connected thereto is slidably inserted into a cylinder, such as a double cylinder hydraulic shock absorber, a hydraulic cylinder, a friction damper, a gas spring, and so on.

According to the cylinder apparatus of the invention as fully described above, because the rebound spring and the stopper unit are provided inside the cylinder, when the piston rod is extended and the rebound spring is compressed, the spring force of the rebound spring will be exerted to suppress further extension of the piston rod. As a result, it is difficult for the piston rod to arrive at the end of its stroke, and at the same time, shocks at the end of the stroke can be moderated. Moreover, when the rebound spring has been compressed up to the determined position, the stopper unit will prevent further compression of the rebound spring, and consequently, an excessive compression of the rebound spring can be prevented.

The invention claimed is:

1. A cylinder apparatus comprising a cylinder, a piston which is slidably inserted into said cylinder, and a piston rod which is connected to said piston at one end of the piston rod and extended outside of said cylinder at the other end, said cylinder apparatus further comprising:
   in said cylinder, a rebound spring having at one end a spring holder which is slidably guided along said piston rod, and whose other end is fixed to said piston rod so as to be compressed by an extending stroke of said piston rod; and
   a stopper unit which is fixed to said piston rod apart from said piston at a position between said spring holder and said piston, and adapted to come into contact with said spring holder before said rebound spring has been compressed to its state of maximum compression, thereby preventing further compression of said rebound spring,
   wherein said spring holder has a bushing on its inner peripheral face, and said spring holder is slidably guided along said piston rod by way of said bushing.

2. A cylinder apparatus as claimed in claim 1, wherein said bushing is coated with a fluorine resin on its inner circumferential face.

3. A cylinder apparatus as claimed in claim 2, wherein a shock absorbing material is attached to said stopper unit at the face of the stopper unit which abuts against said spring holder, for absorbing shock when said stopper unit comes into contact with said spring holder.

4. A cylinder apparatus as claimed in claim 1, wherein a shock absorbing material is attached to said stopper unit at the face of the stopper unit which abuts against said spring holder, for absorbing shock when said stopper unit comes into contact with said spring holder.

* * * * *